(12) United States Patent
Droney

(10) Patent No.: US 8,393,580 B2
(45) Date of Patent: Mar. 12, 2013

(54) MODULAR EXTERNALLY ACCESSIBLE BATTERIES FOR AN AIRCRAFT

(75) Inventor: Christopher K. Droney, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 880 days.

(21) Appl. No.: 12/209,473

(22) Filed: Sep. 12, 2008

(65) Prior Publication Data

US 2010/0065691 A1  Mar. 18, 2010

(51) Int. Cl.
*B64D 9/00* (2006.01)
*B64D 1/08* (2006.01)
*B64D 27/24* (2006.01)

(52) U.S. Cl. ............... 244/137.4; 244/53 R; 244/62

(58) Field of Classification Search ............ 244/17.11, 244/53 R, 54, 58, 118.2, 137.4, 62; 446/57
See application file for complete search history.

(56) References Cited

U.S. PATENT DOCUMENTS

| | | | |
|---|---|---|---|
| 2,472,947 A | 6/1949 | Hlobil | |
| 3,510,107 A | 5/1970 | Fidler | |
| 3,738,058 A * | 6/1973 | Mabuchi | 446/57 |
| 3,827,181 A * | 8/1974 | Mabuchi | 446/57 |
| 4,412,475 A | 11/1983 | Hornby | |
| 4,443,014 A * | 4/1984 | Kovit et al. | 273/363 |
| 4,829,876 A | 5/1989 | Witt | |
| 5,191,370 A * | 3/1993 | Bozzolato | 396/13 |
| 5,228,854 A * | 7/1993 | Eldridge | 434/11 |
| 5,383,810 A * | 1/1995 | Loving | 446/57 |
| 5,810,284 A * | 9/1998 | Hibbs et al. | 244/13 |
| 6,705,571 B2 | 3/2004 | Shay et al. | |
| 6,745,981 B1 * | 6/2004 | Rainer et al. | 244/118.1 |
| 2012/0153087 A1 * | 6/2012 | Collette et al. | |
| 2012/0261522 A1 | 10/2012 | Droney | |

OTHER PUBLICATIONS

Droney, "Modular Externally Accessible Batteries for an Aircraft", U.S. Appl. No. 13/524,541, filed Jun. 15, 2012, 38 pages.
Preliminary amendment dated Jun. 15, 2012 regarding U.S. Appl. No. 13/524,541, 6 pages.
Chan et al., "High-performance lithium battery anodes using silicon nanowires," Nature Nanotechnology, vol. 3, Jan. 2008, pp. 31-35.
Office Action, dated Sep. 17, 2012, regarding USPTO U.S. Appl. No. 13/525,541, 9 pages.

* cited by examiner

*Primary Examiner* — Rob Swiatek
(74) *Attorney, Agent, or Firm* — Yee & Associates, P.C.

(57) ABSTRACT

An aircraft comprises an airframe, an electric propulsion system, a number of battery pods, and an engagement system. The number of battery pods has a physical connector system. The engagement system is attached to the airframe and is capable of engaging the physical connector system to connect the number of battery pods to the airframe.

18 Claims, 9 Drawing Sheets

MODULAR EXTERNALLY ACCESSIBLE BATTERIES FOR AN AIRCRAFT

BACKGROUND INFORMATION

1. Field

The present disclosure relates generally to aircraft and in particular to a method and apparatus for powering an aircraft. Still more particularly, the present disclosure relates to a method and apparatus for providing electric power to an aircraft.

2. Background

The growth of the world economy is strainingnatural resources. Increasing demands for oil and the diminishing supply of oil are resulting in a rapid increase for the price of fuel. These fuel increases include gasoline for automobiles and jet fuel for aircraft. Global consumption of carbon-based energy for fuel and other purposes also is changing the environment in worrisome and unpredictable ways. As a result, carbon-based energy sources (either petroleum based or biofuel) may be subject to regulation and/or taxation. These realizations have driven an interest in alternative fuel sources for aviation and other industries.

Different alternative fuel sources that have been investigated include hydrogen and biofuel. With the use of hydrogen, hydrogen gas may be pressurized or liquefied. Hydrogen may be converted to mechanical energy through combustion and/or electrical chemical conversion. This type of fuel, however, requires specialized storage to hold pressurized and/or liquefied hydrogen gas.

Biofuels do not require specialized storage like hydrogen. Biofuels, however, still may generate emissions, such as carbon dioxide. Another alternative fuel source includes using batteries that generate electrical power. These types of batteries include, for example, lithium polymer batteries that may provide power to an electric propulsor for an aircraft. Current technology batteries, however, may only provide sufficient power for short-range flights. Therefore, it would be advantageous to have an improved method and apparatus for providing power to an aircraft.

SUMMARY

In one advantageous embodiment, an aircraft comprises an airframe, an electric propulsion system, a number of battery pods, and an engagement system. The number of battery pods has a physical connector system. The engagement system is attached to the airframe and is capable of engaging the physical connector system to connect the number of battery pods to the airframe.

In another advantageous embodiment, a fixed wing aircraft comprises a fuselage, a first wing attached to the fuselage, a second wing attached to the fuselage, a tail, an electric propulsion system, an engagement system, and a number of battery pods, wherein the engagement system is capable of engaging the number of battery pods.

In another advantageous embodiment, a method is present for operating an aircraft. The aircraft is flown from a first location to a second location. The aircraft comprises an airframe, an electric propulsion system, a number of battery pods having a physical connector system, and an engagement system capable of engaging the physical connector system. First cargo is removed from the aircraft at the second location. Second cargo is loaded onto the aircraft at the second location. The number of battery pods is removed at the second location, and a new number of battery pods is installed at the second location.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
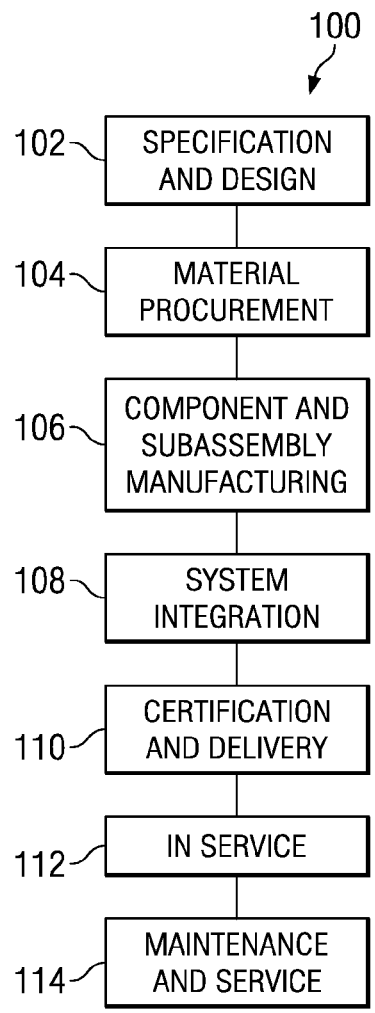
FIG. 1 is a diagram illustrating an aircraft manufacturing and service method in accordance with an advantageous embodiment.
Figure 2:
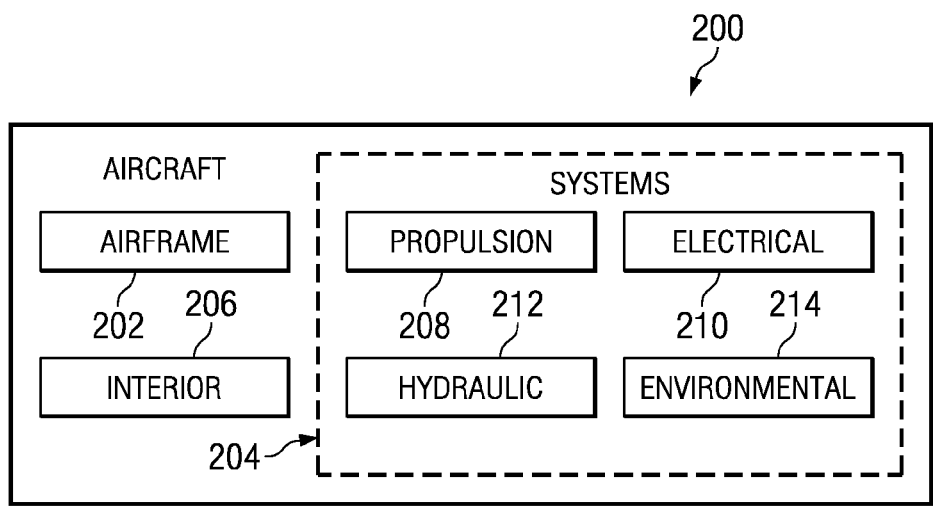
FIG. 2 is a diagram of an aircraft in which an advantageous embodiment may be implemented.

Referring more particularly to the drawings, embodiments of the disclosure may be described in the context of the aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

For example, the different advantageous embodiments may be used during component and subassembly manufacturing 106 to create aircraft 200 with an electrical propulsion system. In another illustrative example, use of an electrical propulsion system in aircraft with battery power systems according to one or more advantageous embodiments may be employed during in service 112.

The different advantageous embodiments recognize that current aircraft propulsion systems convert around one-third of the fuel's energy to thrust energy. The remaining portion of the fuel is wasted as heat and turbulence. Some of the remaining fuel is converted as power for aircraft systems. The different advantageous embodiments also recognize that electric motors with efficient propulsors achieve overall efficiencies of around 80 percent. The different advantageous embodiments recognize that this type of efficiency may partially compensate for lower energy provided by batteries.

The different advantageous embodiments also recognize that the specific energy and energy density of the energy source has a significant influence on the weight and aerodynamic efficiency of an aircraft, especially at longer ranges. In these examples, specific energy may be energy per unit weight, while energy density may be energy per unit volume. The different advantageous embodiments recognize that the energy source also may be a primary driver on the environmental impact caused by a vehicle.

High specific energy is of benefit to an aircraft because the energy required for a particular flight is contained by less weight. For an aircraft of a given size, fuel weight and payload weight drive the operating empty weight of the aircraft. High energy density is desired because less structure is required to contain the fuel and the vehicle incurs a drag penalty for wetted area. Thus, for low energy densities, an aircraft would tend to have more weight and more drag.

The different advantageous embodiments recognize that hydrocarbon fuels may provide an attractive combination of specific energy and energy density and are currently used by different airlines. This type of fuel, however, is a limited resource with increasing costs and environmental impact.

The different advantageous embodiments recognize that the use of batteries provides another form of energy source that has a specific energy that is lower than that of jet fuel and an energy density higher than that of jet fuel.

The different advantageous embodiments recognize that an aircraft with the same number of passengers as a Boeing 737 travelling at a range of 2,000 nautical miles may require around 22,000 pounds of fuel. The different advantageous embodiments also recognize that the same type of aircraft powered by advanced batteries and electric motors may require around 30,000 pounds of energy weight.

The different advantageous embodiments recognize that in spite of the larger weight, the battery powered aircraft may require around 325 cubic feet of energy volume while the currently available aircraft may require around 430 cubic feet of energy volume. The energy volume is the enclosed volume that is required to contain the amount of energy or power for a flight. An aircraft with a particular drag characteristic and a selected payload will require a fixed amount of energy to fly a selected distance. In other words, the volume required to contain the energy depends on the energy density of the energy source.

The different advantageous embodiments also recognize that batteries may be carried internally in a wing or fuselage structure of an aircraft at a volume advantage and a weight penalty. The different advantageous embodiments recognize that one drawback of using integral batteries is that the turnaround time may be limited by battery charge rates. For example, the amount of time needed for an aircraft after arriving at a gate to become ready to leave for another flight may require longer wait times, such as an hour or more. Although batteries may be charged relatively quickly to reduce wait times, this type of charging causes a reduction in battery life. This reduction increases the cost of operating the aircraft.

The different advantageous embodiments employ batteries stored in external pods that are removable from an aircraft. With this type of battery power system, long life may be facilitated with slow charging. Additionally, turnaround time for an aircraft may be decoupled from the charge rate. As a result, these removable batteries may be capable of reducing turnaround time for an electric powered aircraft, as well as increasing the life of the batteries. Further, the different advantageous embodiments may provide a capability to jettison battery modules in appropriate situations.

The different advantageous embodiments provide a method and apparatus for supplying power to an electrically operated aircraft. In one advantageous embodiment, an aircraft has an airframe, an electric motor system, a number of battery pods having a physical connector system, and an engagement system capable of engaging the physical connector system. The term "a number of", when used with reference to items, refers to one or more items. For example, a number of battery pods is one or more battery pods.

Figure 3:
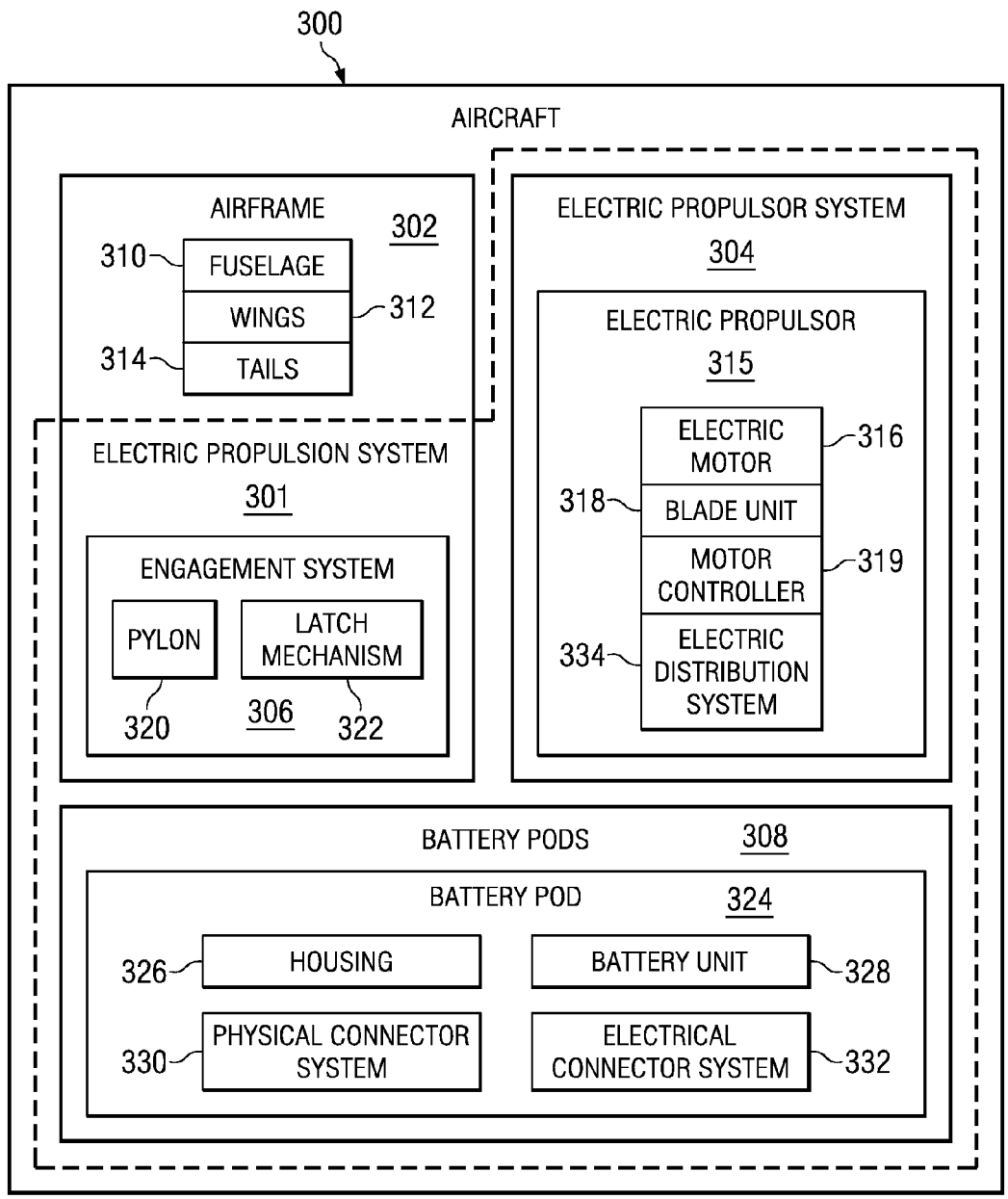
FIG. 3 is a block diagram illustrating a modular externally accessible battery system for an aircraft with electric propulsion in accordance with an advantageous embodiment.

With reference now to FIG. 3, a block diagram illustrating a modular externally accessible battery system for an aircraft with electric propulsion is depicted in accordance with an advantageous embodiment. In this example, aircraft 300 includes electric propulsion system 301, and airframe 302. Electronic propulsion system 301 includes electric propulsor system 304, engagement system 306, and battery pods 308.

Airframe 302 is the mechanical structure of aircraft 300. Airframe 302 may include, for example, without limitation, fuselage 310, wings 312, and tail 314. Of course, airframe 302 may also include other components that make up these different structures. For example, fuselage 310, wings 312, and tail 314 may include ribs, spars, cords, fairings, skin panels, and other structural components that are part of airframe 302.

Electric propulsor system 304 includes components used to propel the aircraft 300. These components may include, for example, electric propulsor 315, which may include electric motor 316 and blade unit 318. Electric propulsor system 304 also may include motor controller 319. Electric motor 316 may be a brushless type motor, in these examples. Blade unit 318 may take various forms, depending on the type of electric propulsion system being used. Although only a single electric propulsor is shown, multiple electric propulsors may be present within electric propulsor system 304.

For example, blade unit 318 may include a ducted fan, a propeller, or some other suitable type of blade unit intended to impart momentum to the surrounding air producing thrust energy.

Engagement system 306 may be a part of or an extension of airframe 302. Engagement system 306 may engage battery pods 308 to provide physical and/or electrical connections. Engagement system 306 engages battery pods 308 to externally attach battery pods 308 to airframe 302. Engagement system 306 may electrically connect battery pods 308 to electric propulsor system 304 to provide power to electric propulsor system 304.

Engagement system 306, for example, may engage battery pods 308 using pylon 320 and latch mechanism 322 to secure battery pods 308 to wings 312. In other advantageous embodiments, engagement system 306 may secure battery pods 308 to fuselage 310. In yet other advantageous embodiments, engagement system 306 may secure battery pods 308 to electric propulsor system 304. Engagement system 306 is capable of jettisoning one or more of battery pods 308 for safety or other suitable reasons.

Battery pods 308 are externally accessible in the different advantageous embodiments. In these examples, battery pod 324 is an example of a battery pod within battery pods 308. Battery pod 324 may be any structure containing a number of batteries that can be removably attached to aircraft 300. Battery pod 324 includes housing 326, battery unit 328, physical connector system 330, and electrical connector system 332, in this illustrative example.

In other illustrative examples, battery pod 324 may include other components in addition to or in place of the ones illustrated in this example. Housing 326, in these examples, may be streamlined and/or aerodynamic. In these examples, battery unit 328 contains batteries and may take various forms. For example, battery unit 328 may comprise at least one of a lithium ion battery, a lithium ion polymer battery, a nickel metal hydride battery, a zinc-bromide flow battery, or some other suitable type of battery. As yet another example, battery unit 328 may include a hydrogen cell system that creates electricity.

As used herein, the phrase "at least one of", when used with a list of items, means that different combinations of one or more of the items may be used and only one of each item in the list may be needed. For example, "at least one of item A, item B, and item C" may include, for example, without limitation, item A, or item A and item B. This example also may include item A, item B, and item C, or item B and item C.

In other examples, "at least one of" may be, for example, without limitation, two of item A, one of item B, and ten of item C; four of item B and seven of item C; and/or other suitable combinations.

Physical connector system 330 may be removably attached to housing 326. In other advantageous embodiments, physical connector system 330 may be integrally formed with housing 326. Physical connector system 330 provides a mechanism to connect battery pod 324 to engagement system 306.

Electrical connector system 332 may be connected to electric propulsor system 304 through engagement system 306, which may in turn be connected to electric propulsor system 304 through electric distribution system 334. Further, electrical connector system 332 provides a conduit for supplying electric power to electric motor 316, as well as a capability to perform diagnostics on battery unit 328.

Electric distribution system 334 may provide a capability to direct power from battery pods 308 to all of the electric engines within electric propulsor system 304. The distribution of power may change, depending on power needs and power supply present in the different battery pods. For example, if a battery unit failure occurs, all electric propulsors within electric propulsor system 304 may still be operated. Further, electric distribution system 334 may adjust the voltage generated by battery pods 308 prior to providing power to electric propulsor system 304.

In the illustrative examples, housing 326 is designed to provide a lowest amount of drag possible when mounted to airframe 302 through engagement system 306. In these different advantageous embodiments, battery pods 308 may be removable in a similar fashion as removable fuel tanks used with currently existing fighter aircraft.

In some advantageous embodiments, battery pods 308 may be connected to wings 312 using pylon 320 and latch mechanism 322 in engagement system 306. In yet other advantageous embodiments, battery pods 308 may be connected directly to fuselage 310 using engagement system 306. Latch mechanism 322 may be an integral part of the structure of fuselage 310 without requiring pylon 320. In this type of embodiment, housing 326 has a conformal or aerodynamic shape that fits into fuselage 310, such that battery pod 324 looks like it is part of fuselage 310. A similar design may be made to integrate or provide a conformal shape to battery pod 324 for one or more of wings 312 and tails 314.

In the different advantageous embodiments, battery pods 308 may be cross-wired such that a failure or loss of power in one battery pod may allow other battery pods to supply electricity to other electric motors.

With the use of electric propulsion system 301, turnaround times for an electrically powered aircraft may be reduced without having to charge a battery in a manner that reduces the life of the battery. With the use of battery pods 308, the batteries may be removed from aircraft 300 and charged battery pods may be connected to aircraft 300. Battery pods 308 may then be charged without requiring aircraft 300 to wait for battery pods 308 to become recharged.

The illustration of aircraft 300 with electric propulsion system 301 is not meant to imply physical or architectural limitations to the manner in which a battery power system may be implemented. The different blocks illustrated are fractional and/or physical components described for purposes of illustrating different features for some advantageous embodiments. In other advantageous embodiments, other components may be used in addition to or in place of the ones illustrated.

For example, in some advantageous embodiments, aircraft 300 may be a helicopter without the need for wings 312. In yet other advantageous embodiments, aircraft 300 may include a mix of traditional fuel-based engines with electric propulsion system 304.

Figure 4:
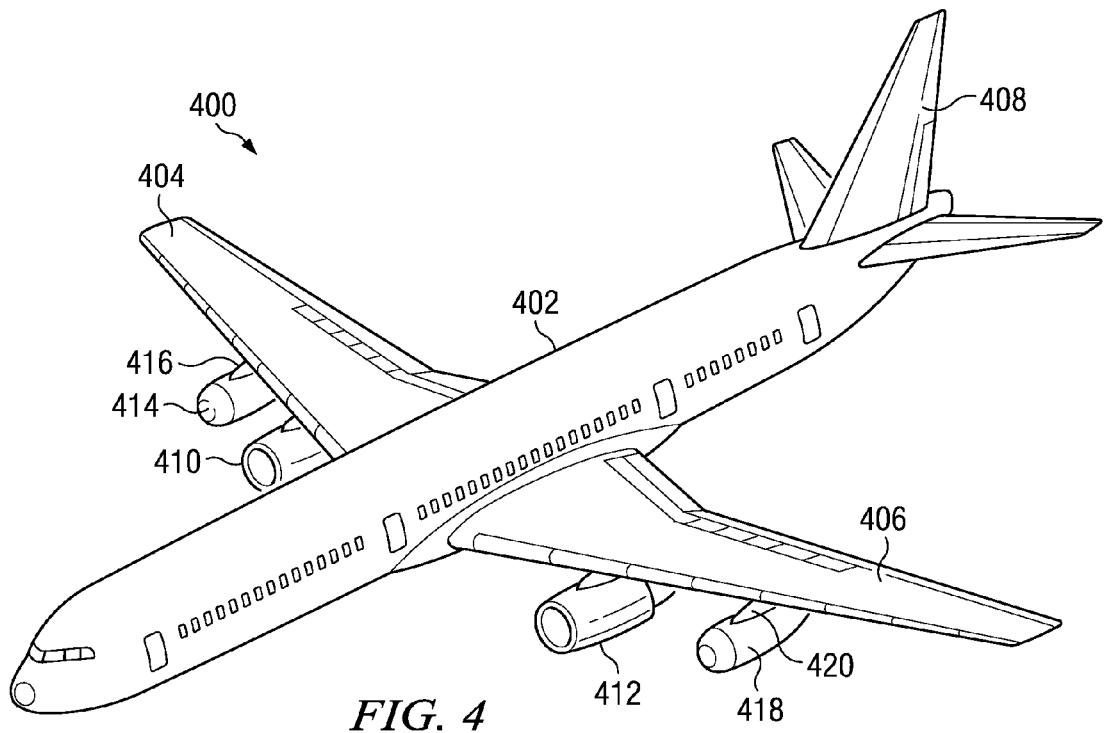
FIG. 4 is a diagram of an aircraft with a battery power system in accordance with an advantageous embodiment.

With reference now to FIG. 4, a diagram of an aircraft with a battery power system is depicted in accordance with an advantageous embodiment. Aircraft 400 is an example of one implementation of aircraft 300 in FIG. 3.

Aircraft 400 has fuselage 402, and wing 404 and wing 406 are connected to fuselage 402. Additionally, aircraft 400 includes tail 408 connected to fuselage 402. Further, electric propulsor 410 and electric propulsor 412 are connected to wing 404 and wing 406 respectively. Electric propulsor 410 and electric propulsor 412 are examples of one implementation of electric propulsor system 304 in FIG. 3. In this example, these electric propulsors are ducted fan type of blade unit and are one implementation of blade unit 318 in FIG. 3.

In this example, battery pod 414 is an example of one implementation for battery pod 324 in FIG. 3 and is connected to wing 404 through pylon 416, which is part of an engagement system. A pylon is a structure used to connect a component, such as a battery pod, to another structure, such as a wing or body of an aircraft. Battery pod 418 is connected to wing 406 through pylon 420, which is part of an engagement system. In these examples, connectors and cables may be located in a leading edge of pylons 416 and 420 and run into the leading edge of wings 404 and 406 to connect to electric engines 410 and 412.

With this type of arrangement, battery pods 414 and 418 may be used on multiple aircrafts of different types. Further, aircraft with different ranges may have different numbers of battery pods. For example, aircraft 400 may be a short-range aircraft having two battery pods, while a long-range aircraft may use four battery pods. Of course, depending on the particular implementation, more than one battery pod may be attached to a pylon.

Figure 5:
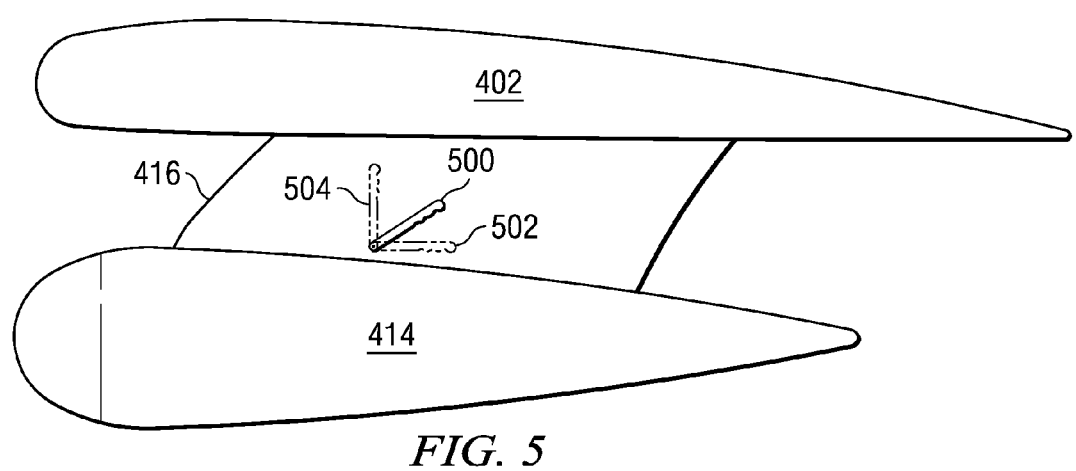
FIG. 5 is a side view of a wing of an aircraft in accordance with an advantageous embodiment.

With reference now to FIG. 5, a side view of a wing of an aircraft is depicted in accordance with an advantageous embodiment. In this example, a side view of wing 402 with battery pod 414 is depicted. In this example, handle 500 is an example of a handle that may be used to engage and disengage a latch mechanism.

In position 502, the latch mechanism is engaged with battery pod 414. When handle 500 is moved to position 504, battery pod 414 may be removed or detached from pylon 416. In this example, handle 500 may be streamlined, in which aerodynamic loads tend to keep handle 500 in a closed position, such as position 502. In other embodiments, controls for the lock mechanism may be located in the aircraft. For example, controls located in the cockpit and/or maintenance area may activate actuators to engage and disengage the engagement system for battery pod 414. These same actuators may used to release the batteries in flight, in case of an emergency.

Figure 6:
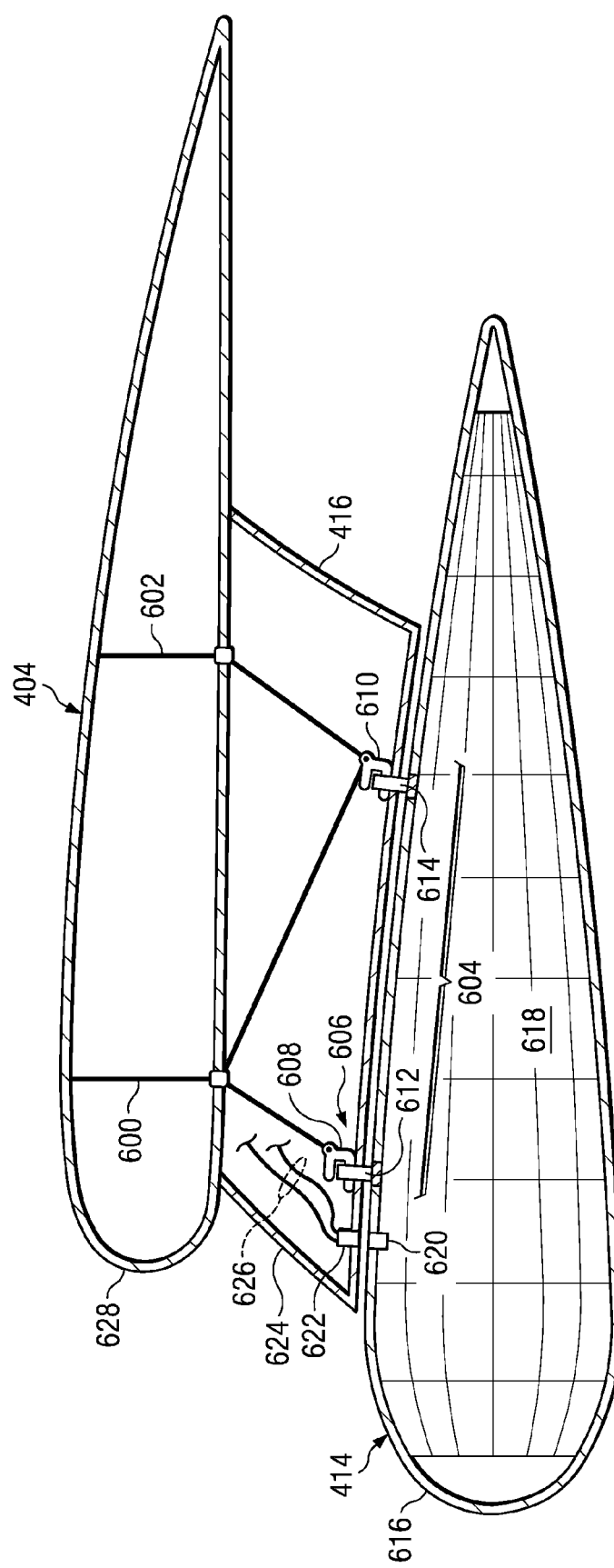
FIG. 6 is a side cross-sectional view of a wing of an aircraft in accordance with an advantageous embodiment.

With reference now to FIG. 6, a side cross-sectional view of a wing of an aircraft is depicted in accordance with an advantageous embodiment. In this example, a side cross-sectional view of wing 404 is illustrated.

In this example, pylon 416 is attached to front spar 600 and rear spar 602 in wing 404. Pylon 416 includes latch mechanism 604, which engages physical connector system 606. In this example, latch mechanism 604 includes hooks 608 and 610, which may engage lugs 612 and 614 in physical connector system 606. In this depicted example, battery pod 414 includes housing 616, which has a streamline and/or aerodynamic shape to reduce drag. Battery unit 618 is located within housing 616. Additionally, housing 616 includes electrical connector 620, which may provide a connection to connector 622 and leading edge 624 of pylon 416. Connector 622 is attached to cable system 626, which may run through leading edge 628 of wing 404 to one or more electric propulsors.

Figure 7:
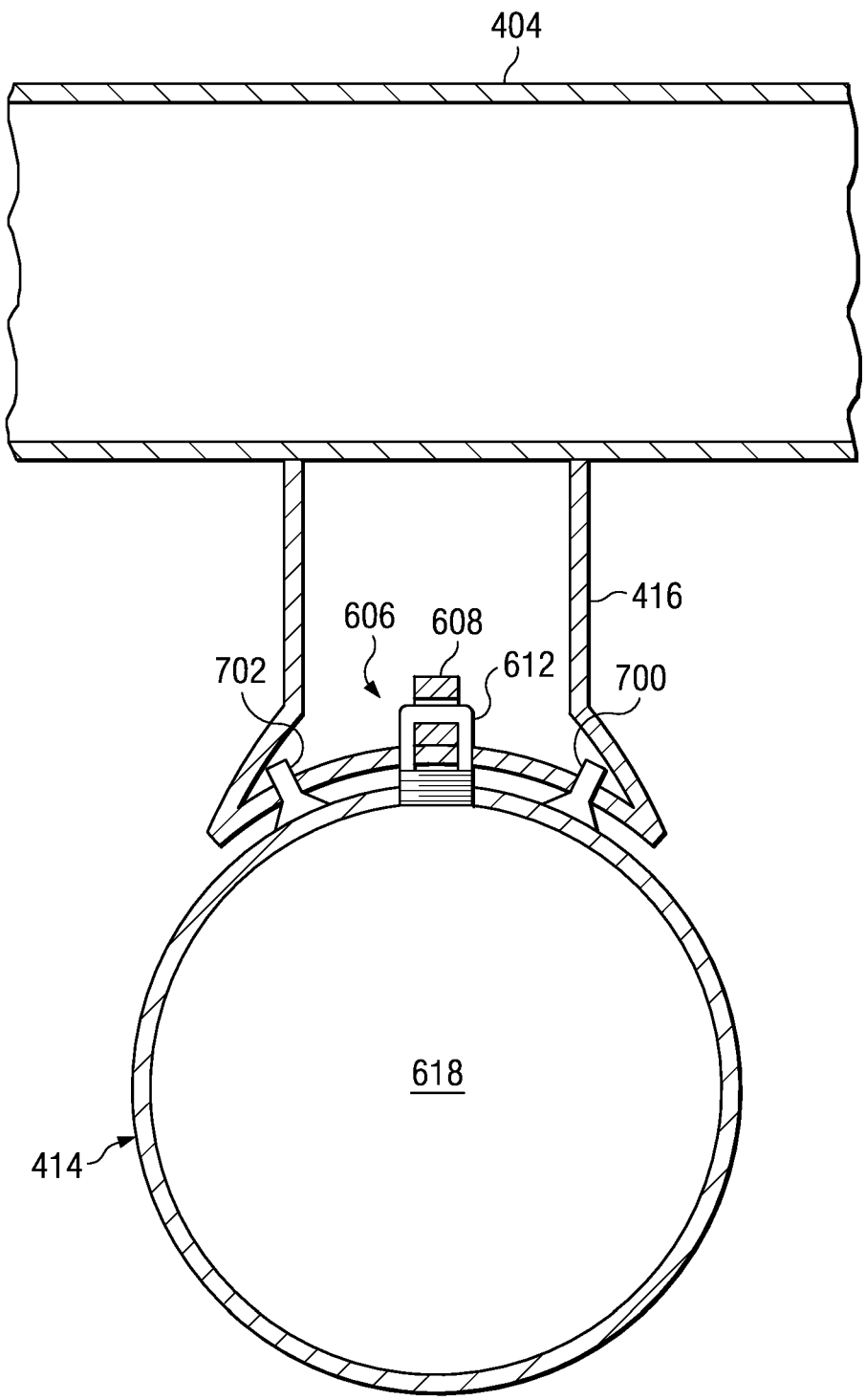
FIG. 7 is a front cross-sectional view of a wing of an aircraft in accordance with an advantageous embodiment.

With reference now to FIG. 7, a front cross-sectional view of a wing of an aircraft is depicted in accordance with an advantageous embodiment. In this example, a front cross-sectional view of a portion of wing 404 is depicted. As can be seen in this example, sway braces 700 and 702 may provide a capability to prevent undesired movement of battery pod 414. Of course, in other advantageous embodiments, additional lugs may be used in addition to or in place of sway braces 700 and 702.

Figure 8:
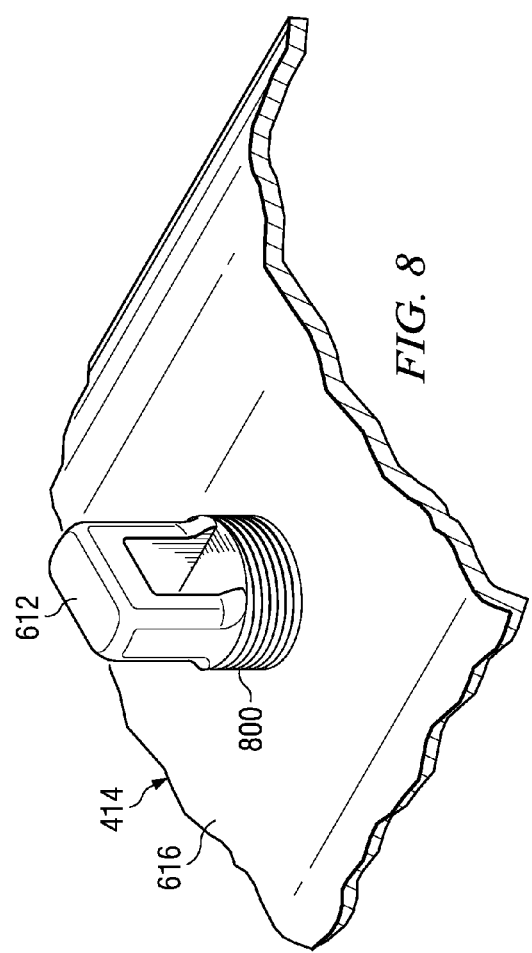
FIG. 8 is a partial view of a battery pod in accordance with an advantageous embodiment.

With reference now to FIG. 8, a partial view of a battery pod is depicted in accordance with an advantageous embodiment. In this example, a partial view of battery pod 414 is illustrated with lug 612. As can be seen in this example, lug 612 includes thread 800 which may be used to fasten lug 612 to housing 616 of battery pod 414.

Figure 9:
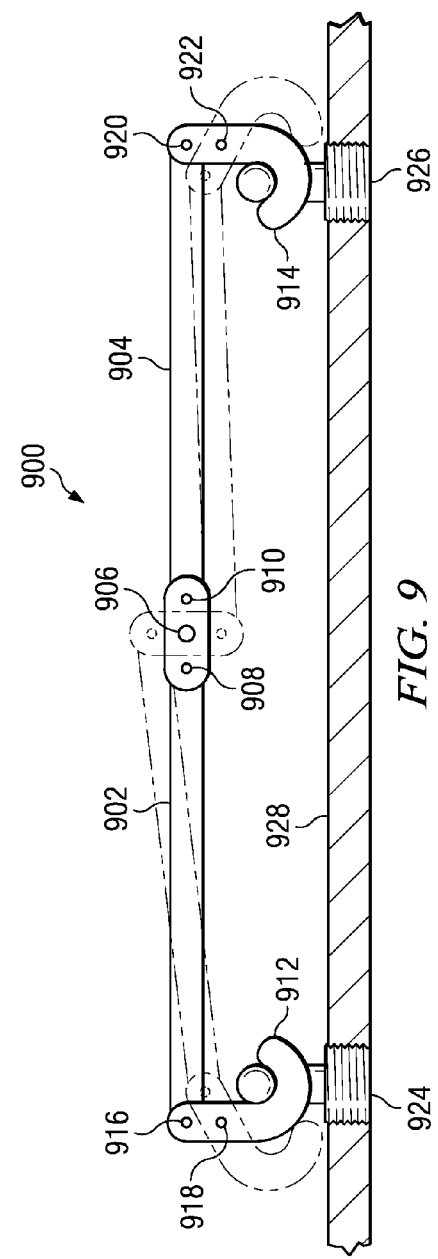
FIG. 9 is a more detailed illustration of a latch mechanism in accordance with an advantageous embodiment.

With reference now to FIG. 9, a more detailed illustration of a latch mechanism is depicted in accordance with an advantageous embodiment. In this example, latch mechanism 900 is a more detailed illustration of one implementation for latch mechanism 322 in FIG. 3, when implemented in the form shown for latch mechanism 604 in FIG. 6.

In this example, latch mechanism 900 includes push rod 902 and push rod 904, which may be attached to rotatable member 906. Rotatable member 906 may be attached to a pylon or some other structure. Push rod 902 is attached to rotatable member 906 through pin joint 908, and push rod 904 is attached to rotatable member 906 through pin joint 910.

Hook 912 and hook 914 are connected to push rod 902 and push rod 904, respectively. In this example, hook 912 is connected to push rod 902 through pin joint 916 and pin joint 918. Hook 914 is connected to push rod 904 through pin joint 920 and pin joint 922.

Latch mechanism 900 is shown in an engaged position with respect to lug 924 and lug 926 in battery pod 928. In this example, latch mechanism 900 is shown in an engaged state with respect to battery pod 928. Latch mechanism 900 may move to a disengaged or open position as shown in phantom latch mechanism 900 may be physically moved between an open and closed state through a handle, such as handle 500 in FIG. 5, attached to rotatable member 906 and operated by a mechanic or other user. In other advantageous embodiments, latch mechanism 900 may be controlled within the aircraft using an actuator and/or a hydraulic system in the aircraft.

The illustration of latch mechanism 900 is not meant to imply physical or architectural limitations to the manner in which other engagement systems may be implemented. Other engagement systems may employ additional or fewer hooks depending on the particular implementation. Also, other engagement systems may use other mechanisms other than hooks. For example, lugs 924 and 926 may be engaged through a pin placed through the lugs and clevises in an alternate type of engagement system. As another example, in some advantageous embodiments, lugs 924 and 926 may be located in the airframe, while latch mechanism 900 may be located in a battery pod.

Figure 10:
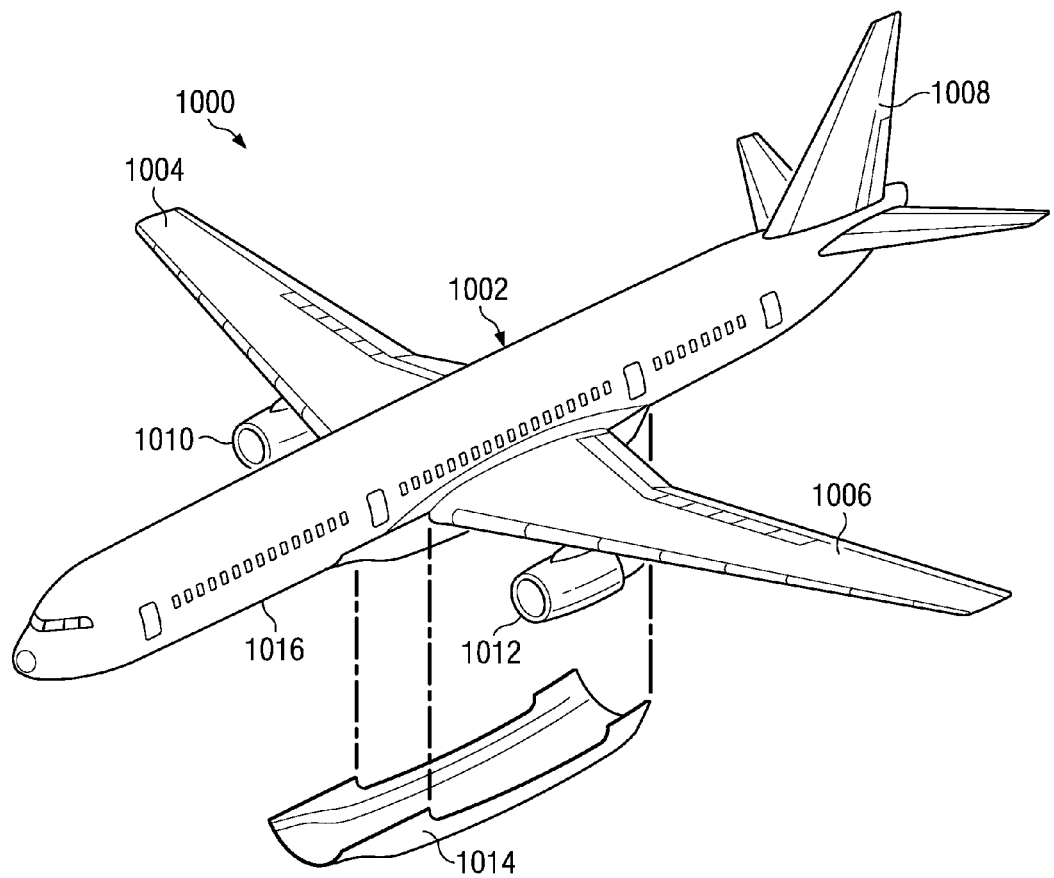
FIG. 10 is a diagram illustrating an aircraft with an electric propulsion system in accordance with an advantageous embodiment.

With reference now to FIG. 10, a diagram illustrating an aircraft with an electric propulsion system is depicted in accordance with an advantageous embodiment. In this example, aircraft 1000 includes fuselage 1002, wing 1004, wing 1006, and tail 1008. Electric propulsor 1010 is attached to wing 1004, while electric propulsor 1012 is attached to wing 1006.

As illustrated in this example, battery pod 1014 may be conformal in shape to fit onto underside 1016 of fuselage 1002. The shape may be selected to reduce drag during the operation of aircraft 1000.

Battery pod 1014 may be connected to fuselage 1002 through an engagement system (not shown). Battery pod 1014 also may be removable after use for replacement with a charged battery pod.

In some other advantageous embodiments, fuselage 1002 may be designed to receive battery pod 1014 in a manner that battery pod 1014 is not visibly apparent as being a battery pod when attached to fuselage 1002.

Figure 11:
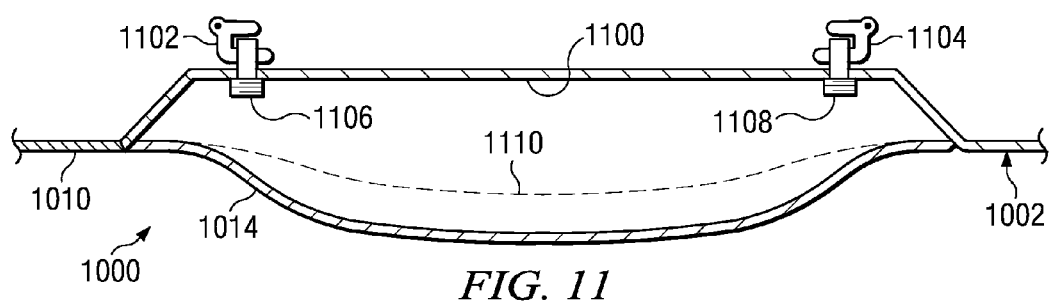
FIG. 11 is a diagram illustrating a cross-sectional view of an aircraft in accordance with an advantageous embodiment.

With reference now to FIG. 11, a diagram illustrating a cross-sectional view of an aircraft is depicted in accordance with an advantageous embodiment. In this example, a cross-sectional view of fuselage 1002 of aircraft 1000 is depicted in accordance with an advantageous embodiment. As can be seen in this example, battery pod 1014 has a shape that may be optimized to an outer mold line of the aircraft. Underside 1016 of fuselage 1002 includes recess 1100 to receive battery pod 1014. Depending on the particular embodiment, recess 1100 may not be present.

In this illustrative example, hook 1102 and hook 1104 are part of a hook engagement system such as, for example, latch mechanism 322 in FIG. 3. Hook 1102 and hook 1104 may engage lug 1106 and lug 1108 in battery pod 1014. Depending on the amount of power needed, battery pod 1014 may be reduced in size and have a low profile shape as shown by dotted line 1110.

Figure 12:
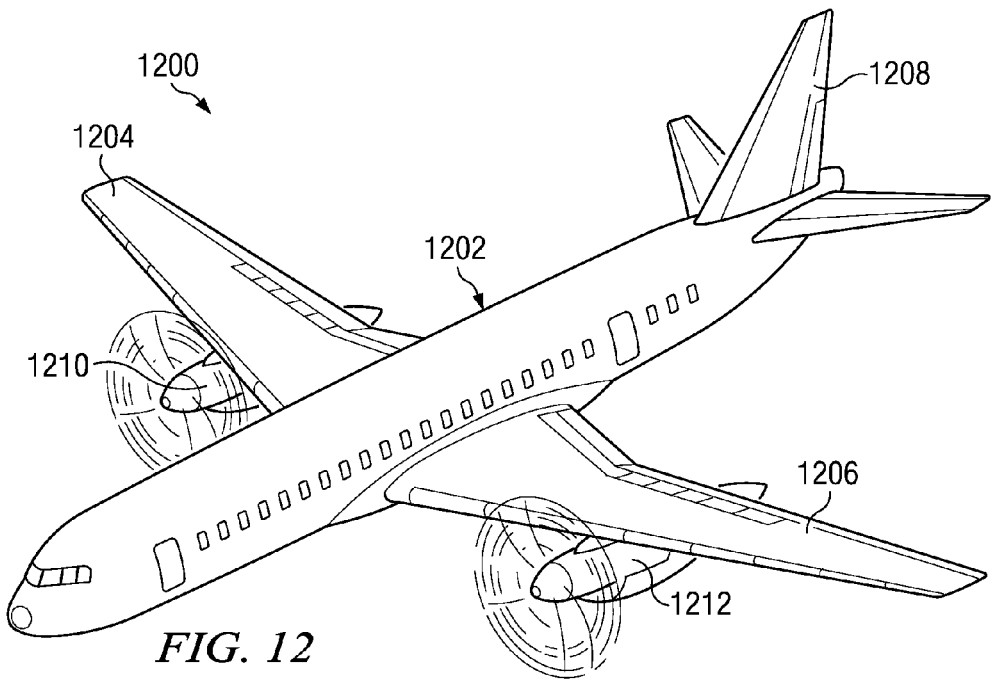
FIG. 12 is a diagram illustrating another aircraft with an electric propulsion system in accordance with an advantageous embodiment.

With reference now to FIG. 12, a diagram illustrating another aircraft with an electric propulsion system is depicted in accordance with an advantageous embodiment. In this example, aircraft 1200 includes fuselage 1202, with wings 1204 and 1206 attached to fuselage 1202. Additionally, aircraft 1200 also includes tail 1208. Electric propulsor 1210 is attached to wing 1204, while electric propulsor 1212 is attached to wing 1206.

In this depicted example, the battery pods are integrated with propulsor 1210 and propulsor 1212. With this type of implementation, lower drag may be accomplished as well as lower transmission power losses with the integration of the battery pods in electric propulsors 1210 and 1212.

Figure 13:
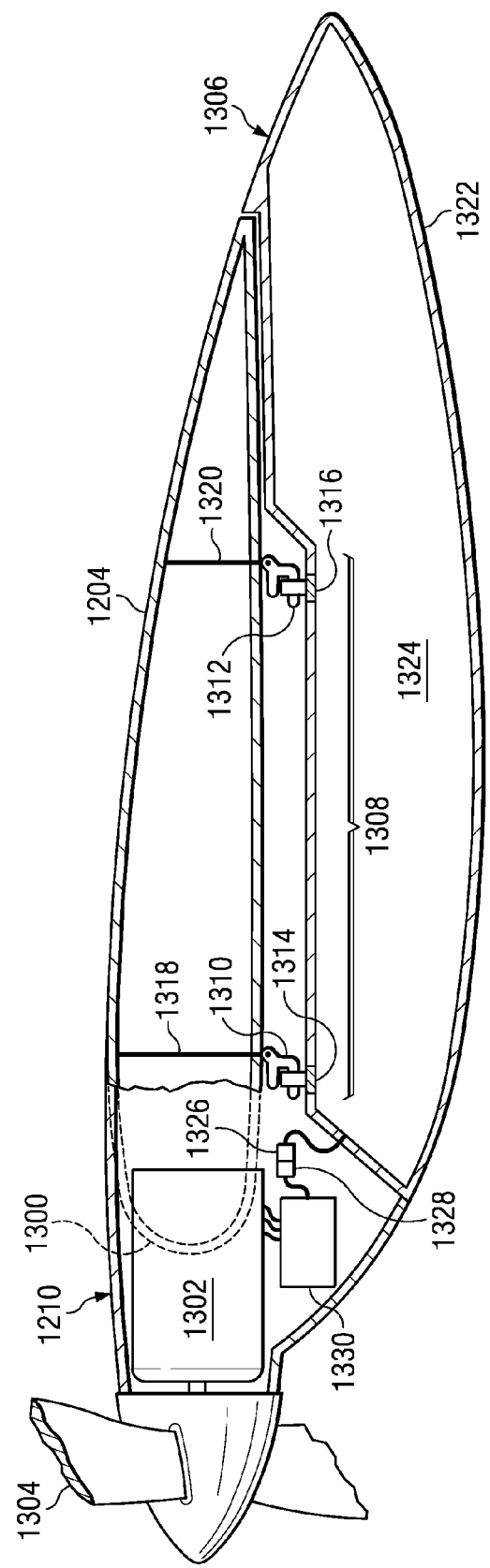
FIG. 13 is a cross-sectional view of a portion of a wing of an aircraft in accordance with an advantageous embodiment.

With reference now to FIG. 13, a cross-sectional view of a portion of a wing of an aircraft is depicted in accordance with an advantageous embodiment. In this example, a side cross-sectional view of wing 1204 is illustrated.

In this example, electric propulsor 1210 is located on leading edge 1300 of wing 1204. Electric propulsor 1210 includes electric motor 1302, Motor Controller 1330, and propeller 1304. Battery pod 1306 has a more conformal shape and is attached to wing 1204 through engagement system 1308. Engagement system 1308 is connected to front spar 1318 and rear spar 1320. Of course, engagement system 1308 may be attached to any portion of an airframe. As can be seen in this example, engagement system 1308 includes hook 1310 and hook 1312, which may engage lug 1314 and lug 1316.

In this depicted example, battery pod 1306 has housing 1322 with battery unit 1324. Additionally, connector 1326 is present in battery pod 1306 to provide a connection to connector 1328 which provides power to the motor controller 1330.

As can be seen in this example, housing 1322 of battery pod 1306 is conformal in shape to further reduce drag on an aircraft.

Figure 14:
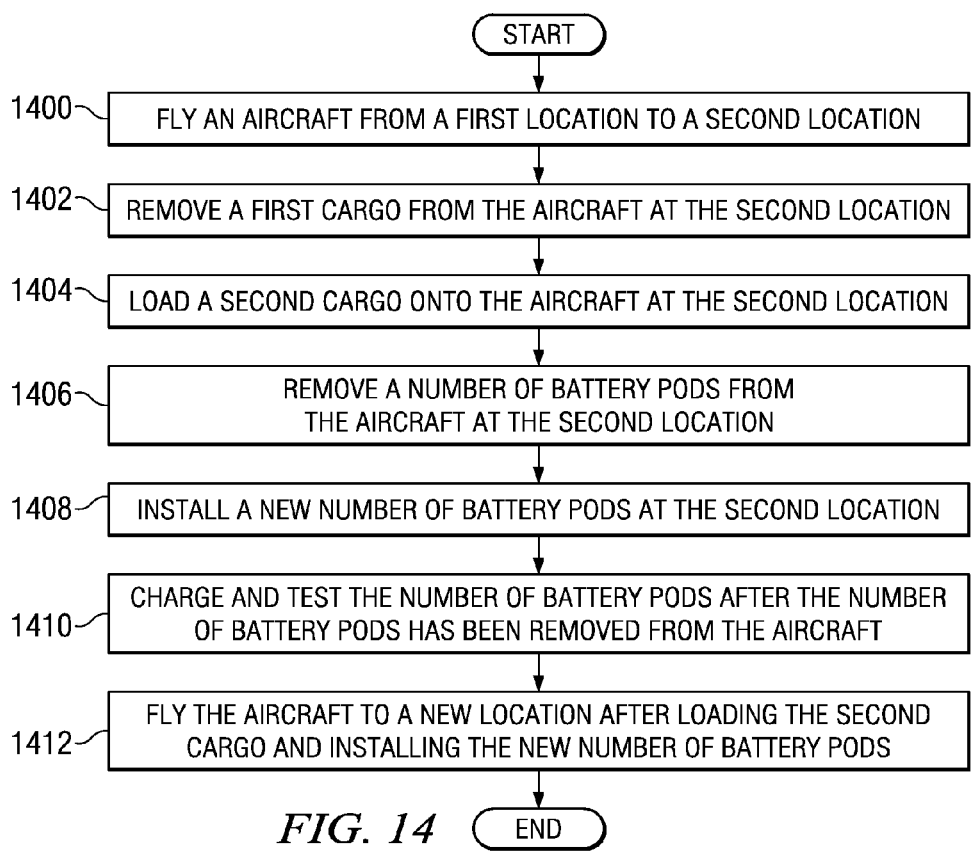
FIG. 14 is a flowchart of a process for operating an aircraft in accordance with an advantageous embodiment.

With reference now to FIG. 14, a flowchart of a process for operating an aircraft is depicted in accordance with an advantageous embodiment. The process illustrated in FIG. 14 may be implemented using an aircraft such as, for example, aircraft 1200 in FIG. 12.

The process begins by flying an aircraft from a first location to a second location (operation 1400). This aircraft may be an aircraft such as, for example, aircraft 300 in FIG. 3. The process removes a first cargo from the aircraft at the second location (operation 1402). In these examples, cargo may be, for example, goods and/or people. A second cargo is then loaded onto the aircraft at the second location (operation 1404).

A number of battery pods is removed from the aircraft at the second location (operation 1406). A new number of battery pods is installed at the second location (operation 1408). These new battery pods are ones that are charged for a second flight. The new battery pods may be selected on the basis of health. In some cases, a battery pod may deteriorate over time such that the amount of energy that can be held by the battery pod may be reduced. As a result, these battery pods may not provide sufficient energy for long range flights, while providing sufficient energy for shorter range flights.

The battery pods removed in operation 1406 are then charged, tested, and maintenance is performed if necessary (operation 1410). Operation 1410 is performed without impeding the aircraft's ability to depart. In other words, the aircraft turnaround time is not affected by charging and maintaining the battery pods.

The aircraft is then flown to a new location after loading the second cargo and installing the new number of battery pods (operation 1412), with the process terminating thereafter.

In this manner, the re-supplying of power to an electrically powered aircraft may be performed in a manner that disconnects the recharging of batteries from the time needed to turn around an aircraft. In these different advantageous embodiments, an aircraft may have used and/or depleted the battery pods removed, and new battery pods may be attached to the aircraft. This type of process may occur while cargo is being removed and/or loaded onto the aircraft. As a result, the turnaround time of an aircraft does not require waiting for charging of batteries.

The illustration of different operations in FIG. 14 is provided for purposes of illustrating a turnaround for an aircraft. Depending on the particular implementation, additional or fewer operations may be performed in addition to those illustrated in FIG. 14. Also, different operations may be performed in different orders depending on the particular implementation.

For example, the battery pods may be removed at the same time that cargo is being removed and/or loaded onto the aircraft. In other advantageous embodiments, the battery pods may be removed and/or installed prior to removal and loading of cargo. Thus, the different advantageous embodiments provide a method and apparatus for providing electric power to electric propulsors in an aircraft.

The different advantageous embodiments provide largely external accessible batteries in a manner that reduces the time that an aircraft must wait between flights. The different advantageous embodiments provide removable battery pods. With this type of feature, depleted or used battery pods may be removed from an aircraft, and new battery pods may be installed onto the aircraft. In different advantageous embodiments, these batteries are externally accessible to further reduce the time and effort needed to refuel or replace battery pods for an aircraft.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for operating an aircraft, the method comprising:
   flying the aircraft from a first location to a second location, wherein the aircraft comprises an airframe; a number of battery pods having a physical connector system; and an engagement system connected to the airframe and configured to engage the physical connector system;
   removing first cargo from the aircraft at the second location;
   loading second cargo onto the aircraft at the second location;
   removing at least one of the number of battery pods at the second location; and
   installing a new number of battery pods at the second location.

2. The method of claim 1 further comprising:
   charging the number of battery pods after the number of battery pods have been removed from the aircraft.

3. The method of claim 1 further comprising:
   flying the aircraft to a new location after loading the second cargo and installing the new number of battery pods.

4. The method of claim 1, wherein the engagement system comprises a pylon attached to the airframe of the aircraft, and wherein the method further comprises:
   engaging the physical connector system for the number of battery pods to a latch mechanism attached to the pylon.

5. The method of claim 1, wherein the engagement system comprises a number of sway braces.

6. The method of claim 1, wherein the physical connector system comprises a number of lugs attached to the number of battery pods.

7. The method of claim 6 further comprising:
   removably attaching the number of lugs to the number of battery pods.

8. The method of claim 1, further comprising:
   jettisoning, by the engagement system, at least one of the number of battery pods during flight.

9. The method of claim 1, wherein each battery pod in the number of battery pods comprises a housing, the physical connector system, and a battery unit.

10. The method of claim 9, wherein the battery unit comprises at least one of a lithium ion battery, a lithium ion polymer battery, a nickel metal hydride battery, and a zinc-bromide flow battery.

11. The method of claim 1, wherein the aircraft further comprises an electric propulsion system.

12. The method of claim 11 further comprising:
   using, by a number of electric propulsors in the electric propulsion system, a blade selected from one of a ducted fan and a propeller in order to impart thrust to the aircraft.

13. The method of claim 11, wherein at least one battery pod in the number of battery pods is integrated with the electric propulsion system.

14. The method of claim 1, wherein the airframe comprises a fuselage, a tail, and a number of wings.

15. The method of claim 14, further comprising:
   removably connecting, by the engagement system, the number of battery pods to at least one of the fuselage, the tail, and the number of wings.

16. The method of claim 14 further comprising:
   engaging, by the engagement system, a battery pod in the number of battery pods to the fuselage.

17. The method of claim 16, wherein the battery pod has a shape conforming to an outer mold line of the fuselage.

18. The method of claim 1, wherein the aircraft is selected from one of a fixed wing aircraft and a rotary wing aircraft.

* * * * *